United States Patent [19]
Laforge et al.

[11] Patent Number: 6,115,825
[45] Date of Patent: Sep. 5, 2000

[54] METHOD FOR SYNCHRONIZATION DISTRIBUTION IN A COMMUNICATIONS NETWORK

[75] Inventors: Vallier Maurice Laforge, Hull; Geoff A. Bruce-Payne, Ottawa; Sarto Barsetti, Aylmer; Michael J. Green, Nepean, all of Canada

[73] Assignee: Nortel Networks Corporation, Montreal, Canada

[21] Appl. No.: 09/151,299

[22] Filed: Sep. 11, 1998

[51] Int. Cl.$^7$ .............................. G06F 1/12; G06F 13/00; H04L 7/00
[52] U.S. Cl. ........................................... 713/400; 713/201
[58] Field of Search .................................. 713/400, 600, 713/201, 500

[56] References Cited

U.S. PATENT DOCUMENTS

| | | | |
|---|---|---|---|
| 5,068,877 | 11/1991 | Near et al. ............................... | 375/107 |
| 5,600,632 | 2/1997 | Schulman ................................ | 370/252 |
| 5,666,330 | 9/1997 | Zampetti .................................. | 368/47 |
| 5,726,979 | 3/1998 | Henderson ............................... | 370/254 |
| 5,828,670 | 10/1998 | Narasimha et al. ..................... | 370/516 |
| 5,920,542 | 7/1999 | Henderson ............................... | 370/217 |
| 5,956,347 | 9/1999 | Slater ...................................... | 370/503 |

OTHER PUBLICATIONS

"Digital Network Synchronization Plan Engineering The Synchronization Network" GR–436–Core; Issue Jun. 1, 1994, Revised Jun. 1, 1996 pp. 5–1 to 5–26.

*Primary Examiner*—Thomas C. Lee
*Assistant Examiner*—Omar A. Omar

[57] ABSTRACT

A method for distributing synchronization in an optical communications network is disclosed. In order to keep costs to a minimum, the method consists of deploying requisite primary reference source (PRS) clocks only at those sites having access to more or less than two independent synchronization distribution paths (SDPs). PRS clocks are also preferably installed at sites located substantially far from a site already equipped with a PRS clock. As a result, a small number of PRS clocks end up being installed, leading to substantial cost savings for the telecommunications service provider. Subsequently, a building integrated timing supply (BITS) system is deployed at all sites comprising more than one network element. The BITS has two timing inputs, a primary and a secondary timing reference, selected from two of the accessible SDPs. Synchronization status messaging (SSM) is then enabled at selected network elements in order to prevent the occurrence of timing loops while the number of network elements that need to be equipped with SSM by appropriately choosing which SDPs are used for the primary and secondary timing references.

18 Claims, 10 Drawing Sheets

METHOD FOR SYNCHRONIZATION DISTRIBUTION IN A COMMUNICATIONS NETWORK

FIELD OF THE INVENTION

The present invention relates to the synchronization of digital equipment and more particularly to a novel method for planning the synchronization distribution of a communications network. The invention is applicable to optical telecommunications networks spanning various administrative domains, such as local exchange carriers (LECs) and inter-exchange carriers (IECs).

BACKGROUND OF THE INVENTION

A typical optical communications network can be topologically broken down into a combination of ring ADM (add-drop multiplexer) systems, linear ADM systems and linear point-to-point systems. While it is possible to define other system categories, it is generally accepted that most optical telecommunications networks consist of one or more of these three classes.

A ring ADM system generally comprises a collection of network elements, each of which is connected to two adjacent network elements by respective segments of optical fiber that usually carries bidirectional traffic according to a standard such as SONET (synchronous optical network) or SDH (synchronous digital hierarchy). Incidentally, while such a ring system is commonly referred to as a ring ADM system, the network elements themselves may be add-drop multiplexers, regenerators, multi-wavelength optical repeaters or switches.

A linear ADM system resembles a broken and unravelled ring ADM system, having a pair of terminal network elements (to each of which only one other network element is connected). A point-to-point linear system, on the other hand, comprises a single pair of network elements joined by optical fiber carrying SONET or SDH traffic.

Network elements are placed at physical locations known as sites. A site generally comprises one or more network elements that belong to various systems (ring ADM, linear ADM, linear point-to-point, etc.), which may or may not communicate information amongst each other. Synchronous operation of the network is achieved through the transmittal of data by the network elements at each site at a precise rate controlled by an electronic clock signal. This clock signal may be generated at the site itself or received from a neighbouring site.

Prior to the advent of SONET, it was common to distribute timing between adjacent sites through the use of a DS1 (digital signal first level) signal. In more recent networks employing SONET, DS1 clock signals are still used for intra-office timing distribution but are derived from incoming optical carrier (OC-N) signals, where N is a multiple of 51.84 Megabits per second and represents the bit rate of the optical signal. A suitable method for deriving DS1 from SONET overhead is described in Bellcore's GR-253 specification, which is hereby incorporated by reference herein.

It is known that the precision of the clock signal used at a site directly influences performance of the network elements at that site when measured in terms of data errors. In general, the higher the precision, the better the performance. In a typical network, the most precise (and expensive) type of clock available is a so-called primary reference source (PRS) clock. The frequency of a PRS clock is usually obtained from an atomic clock or a satellite-based system such as GPS or LORAN-C. A PRS clock is designated as having stratum level 1 (ST1) and its quality is typically measured in terms of its free-run accuracy, as defined in ANSI standard T1.101.

Since PRS clocks are relatively expensive, most sites in the network do not comprise their own PRS clocks. Rather, these "intermediate sites" rely on external timing references from neighbouring upstream sites and also distribute timing to neighbouring downstream sites.

Aside from those intermediate sites which comprise a single network element that terminates a linear ADM system or a chain of linear point-to-point systems, intermediate sites can receive timing signals via at least two potential timing references (PTRs). Derived DS1 synchronization reference signals are extracted from the overhead portion of SONET frames arriving on one of the PTRs known as a "primary" timing reference, which is used under normal circumstances as the preferred timing reference for that site. A second derived DS1 synchronization reference (extracted from another PTR) is used as a "secondary" timing reference in case of failure of the primary timing reference. Since the site typically comprises multiple network elements, timing would ordinarily be distributed to all network elements at the site by means of a building-integrated timing supply (BITS), so that at any given time, a single timing reference provides timing to all the signals leaving the site.

To better explain timing distribution using a BITS, FIG. 1 shows an intermediate site 100 comprising a network element 101 which belongs to a ring system and two network elements 102,103 which join two linear point-to-point systems in a back-to-back configuration. Network element 101 is connected to bidirectional fiber segments 105 and 106, network element 102 is connected to a bidirectional fiber segment 107 and network element 103 is connected to a bidirectional fiber segment 108.

The intermediate site 100 also comprises a BITS 104 for timing distribution, and the site is therefore referred to as an "intermediate BITS site". There are four PTRs provided by the fiber segments 105–108, among which only two are selected as the timing inputs to the BITS 104. Specifically, the SONET frames arriving on fiber segments 105 and 108 are used for the derivation of DS1 timing signals, becoming DS1 timing inputs 115,118 that are fed to the BITS 104. The selection of which two among the four potential timing references arriving on fiber segments 105–108 are to be used for deriving the timing inputs to the BITS 104 is usually effected quite arbitrarily, and the significance of such a selection is often overlooked by network planners.

From its two timing inputs 115,118, the BITS 104 selects, by means of a switch 114, one of these as a timing signal 124 to be distributed to the network elements 101,102,103 at the intermediate BITS site 100. One of the two timing inputs 115,118 is the so-called primary timing reference and under normal conditions is more reliable than the other (secondary) timing reference, e.g., by virtue of being closer to a PRS. Under normal circumstances, therefore, the selected default timing input to be redistributed by the BITS 104 to the network elements 101–103 is the primary timing reference. Under other circumstances, e.g., during fault conditions, the BITS 104 switches over to the secondary timing reference. Assigning one of the timing inputs as the primary timing reference and the other as the secondary timing reference is a system-level decision.

It is also usual to install a BITS at a PRS site, in which case no derivation of DS1 signals from incoming fiber systems is necessary as the highest quality clock is generated at the PRS site itself.

Ensuring a timely switchover from the primary timing reference to the secondary one is an important issue affecting all intermediate sites, regardless of whether or not these sites are BITS-equipped. For example, suppose that a site Y is located between a site X and a site Z, site Y taking its primary clock from site X and its secondary clock from site Z.

If site Y switches from its primary clock to its secondary clock immediately upon detecting degradation of the primary clock (from site X), then the secondary reference (from site Z) is not guaranteed to be reliable. In fact, the clock signal produced by site Z may be a redistribution of a clock signal already distributed to site Z by site Y, in which case site Y would then be relying on an internally generated non-PRS clock. In the network synchronization art, this is known as a timing loop, and has deleterious consequences that include the loss of data.

One straightforward technique which remedies the problem of timing loops is the placement of a PRS clock at every or every second site in the network. While this "solution" is attractive due to its simplicity, it carries with it a hefty price tag for the telecommunications service provider in the form of a multitude (on the order of hundreds) of expensive PRS clocks.

Another way to help reduce the risk of creating timing loops is to use so-called synchronization status messaging (SSM) between neighbouring sites, whereby the quality of a redistributed clock is transmitted to adjacent sites as part of the timing signal itself. Thus, a network element or a BITS equipped with SSM capability reads synchronization-related messages at its two inputs, which control the instant at which the switchover to the secondary timing reference is to be performed. A more complete description of SSM may be found by consulting Bellcore's GR-436-CORE document, revision 1, June 1996, Section 5.4.6, which is hereby incorporated by reference herein.

However, choosing to employ SSM at all the network elements and BITSes in a complex network is expensive and still does not guarantee the elimination of all possible timing loops. In fact, in order to obliterate timing loops entirely, it is necessary to consider the enabling of selected sites with SSM in a joint fashion with the placement of PRS clocks and the installation of BITSes. At the same time, consideration must be given to the cost of installing PRSs and BITSes, and that of enabling sites with SSM. Since the prior art teaches no economical method for jointly considering the above three factors, it is usually the case that network planners apply empirical design methodologies based on years of personal experience with a narrow range of network types, which is a serious disadvantage when the planner is faced with a new, large and entirely different network configuration.

SUMMARY OF THE INVENTION

It is an object of the present invention to mitigate or obviate one or more disadvantages of the prior art.

It is a further object of the present invention to provide a cost-effective design method which eliminates the risk of creating timing loops in an optical telecommunications network using a combination of selective placement of PRS clocks, selective installation of BITSes and enabling SSM at selected sites.

Therefore, the invention may be summarized according to a first broad aspect as a method of synchronizing a communications network having a plurality of interconnected sites, each site comprising at least one network element and being connected to at least one other site via a respective network segment providing a potential timing reference (PTR) for the site, the method comprising the steps of: (1) selecting the sites at which primary reference source (PRS) clocks are to be deployed;(2) selecting the sites at which building integrated timing supplies (BITSes) are to be installed; and (3) at sites not comprising a PRS, selecting primary and secondary timing references for the site from among the PTRs and selecting which sites to enable with synchronization status messaging (SSM).

According to a second broad aspect, the invention may be summarized as a computer-readable storage medium containing software that, when running on a processor, follows a sequence of steps to synchronize a communications network having a plurality of interconnected sites, each site comprising at least one network element and being connected to at least one other site via a respective network segment providing a potential timing reference (PTR) for the site, the steps comprising: (1) selecting the sites at which primary reference source (PRS) clocks are to be deployed; (2) selecting the sites at which building integrated timing supplies (BITSes) are to be installed; and (3) at sites not comprising a PRS, selecting primary and secondary timing references for the site from among the PTRs and selecting which sites to enable with synchronization status messaging (SSM).

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
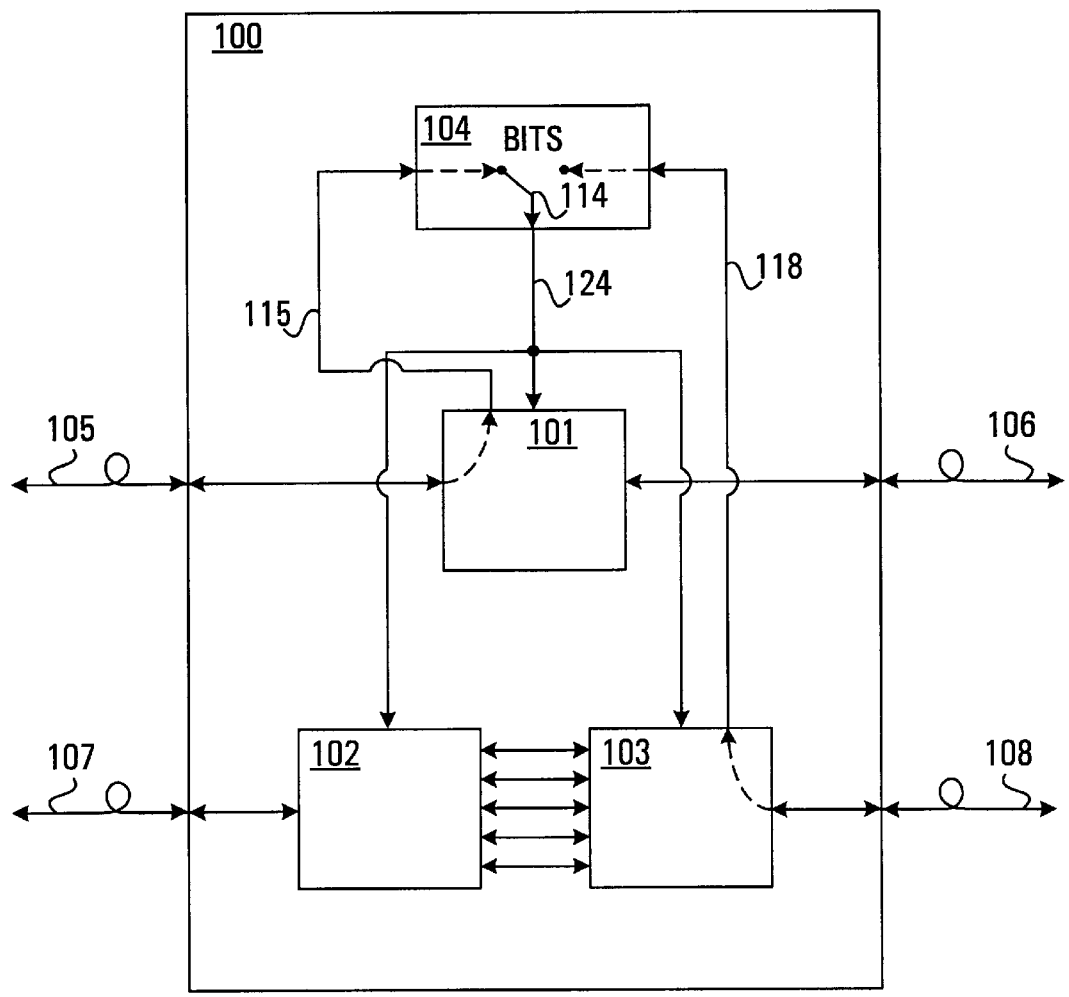
FIG. 1 shows an example prior art intermediate BITS site with four synchronization distribution paths.
Figure 2:
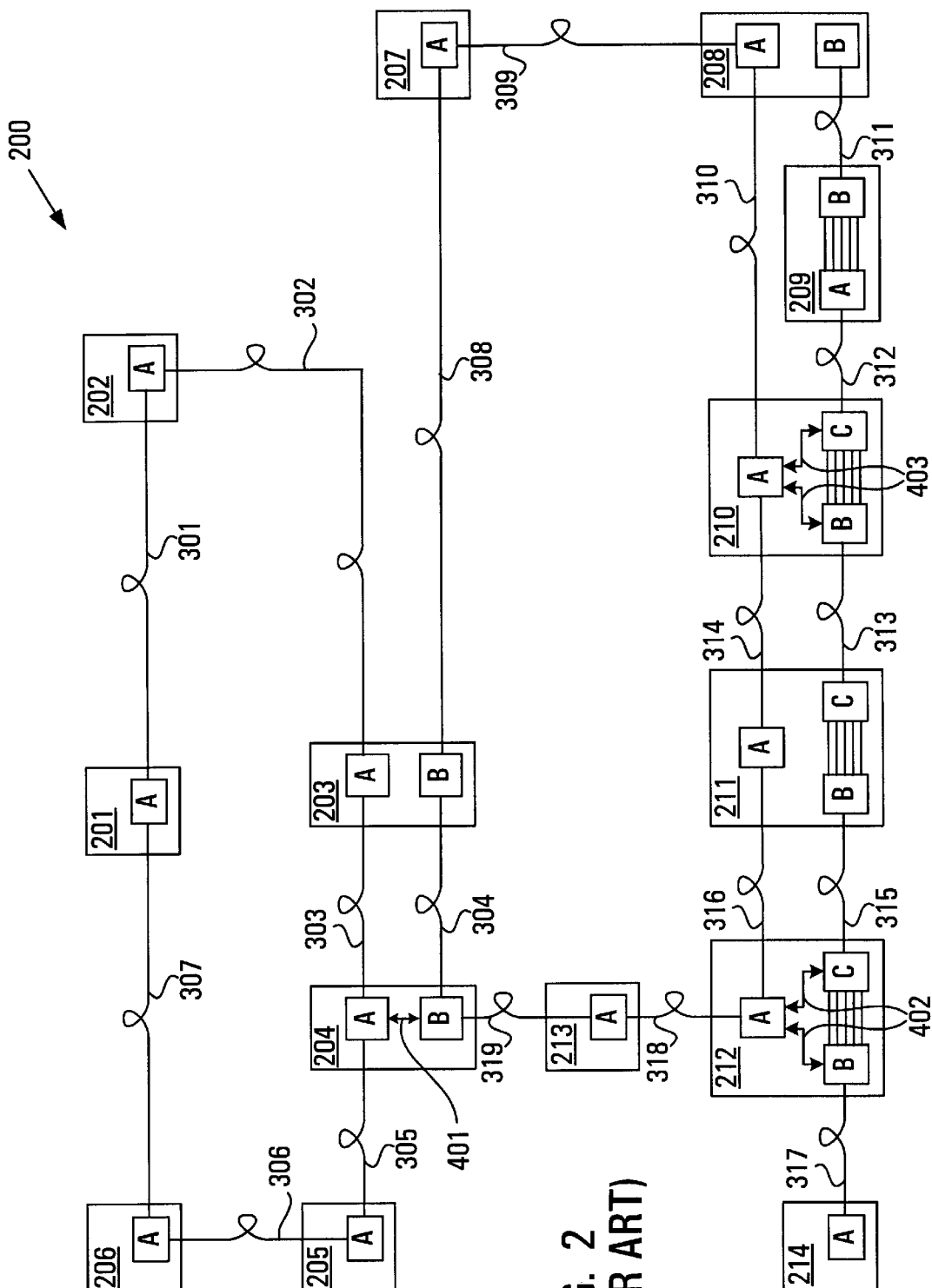
FIG. 2 depicts an example telecommunications network which is used to illustrate applicability of the present invention.

In order to explicitly describe the invention, it is important to first develop a precise terminology that will be used throughout the description and claims. To this end, FIG. 2 shows an example optical telecommunications network 200 comprising a plurality of sites 201–214 interconnected by bidirectional fiber optic segments 301–319. In the example network 200, each site 201–214 is seen to comprise one, two or three network elements, each of which is connected to either one or two fiber optic segments.

Generally, it is helpful (and usually possible) to view each network element as part of a ring ADM system, a linear ADM system or a linear point-to-point system. For example, at site 201, network element 201A can be considered part of a ring ADM system consisting of network elements 201A, 202A, 203A, 204A, 205A and 206A. Similarly, at site 212, network element 212A can be considered as part of a ring ADM system consisting of network elements 212A, 213A, 204B, 203B, 207A, 208A, 210A and 211A. If any one fiber optic segment in a ring ADM system were missing from FIG. 2, then the corresponding network elements, formerly members of a ring ADM system, could be viewed as forming a linear ADM system.

Site 212 further comprises both a network element 212B, considered part of a linear point-to-point system joining this network element with network element 214A at site 214 via segment 317, and a network element 212C, considered part of another linear point-to-point system joining this network element to network element 211B at site 211 via segment 315. Network elements 212B and 212C are linked together at site 212 in a so-called back-to-back configuration.

Both network elements 212B, 212C are also seen to be connected to network element 212A via two internal links 402. In telecommunications networking terminology, site 212 would be better known as a "junction office". Other sites that are junction offices include site 204, at which network elements 204A and 204B are joined by an internal link 401 and site 210, at which network elements 210B and 210C are joined to network element 210A by a pair of internal links 403.

It is to be appreciated that the topology of the example network 200 in FIG. 2 is completely arbitrary, and has been created with the aim of illustrating the applicability of the present invention. The use or designation of junction offices therefore serves only as an example. Furthermore, pairs of fiber optic segments each devoted to a single direction of traffic flow may substitute each of the bidirectional fiber optic segments 301–317 shown in the example network 200.

As previously discussed, timing for each site can either be generated at the site (by a PRS clock) or it can be derived from network elements at neighbouring sites. For the purposes of understanding the present invention, it is important to introduce the notion of the number of potential timing references (PTRs) that are available to a site that does not generate its own timing. Among these PTRs, a certain number will be "independent". An ideal manner of illustrating the concept of an independent PTR is by way of example, with continued reference to FIG. 2.

Considering site 214, for instance, it is clear that a timing reference is only derivable from segment 317, i.e., there is but one PTR which is independent by default.

Next, one can consider site 201, which is shown connected to segments 301 and 307. Clearly, only two PTRs are available. Similarly, sites 202, 205, 206, 207, 209 and 213 also have access to exactly two PTRs. In each of these cases, the two available PTRs are independent, since they are derived from segments arriving from completely different directions of the network.

For the remaining sites the situation is quite different. At site 204, for example, timing is derivable from four PTRs, provided by segments 303, 304, 305 and 319. However, segments 303 and 304 are connected to a common site, namely site 203, while segments 305 and 319 diverge from site 204 in completely different directions. As a result, site 204 in fact has only three independent PTRs, which is also true of sites 203 and 212.

Similarly, it is determined that site 211 has only two independent PTRs, respectively originating from neighbouring sites 210 and 212. Regarding site 210, although it is connected to three other sites (208, 209 and 211), it too will have only two independent PTRs (the PTR from site 209 is not independent because in fact it leads from site 208 along the same general direction). Similarly, site 208 has two independent PTRs.

Having described the notion of a PTR, and in particular that of an independent PTR, the present invention may be compactly summarized by three principal steps, each of which is described in detail hereunder. Incidentally, it is to be understood that the method disclosed herein may be executed by a computing device or by a human network planner in a straightforward manner.

STEP I: Selection of the Sites at Which PRS Clocks are to be Deployed

Figure 3A:
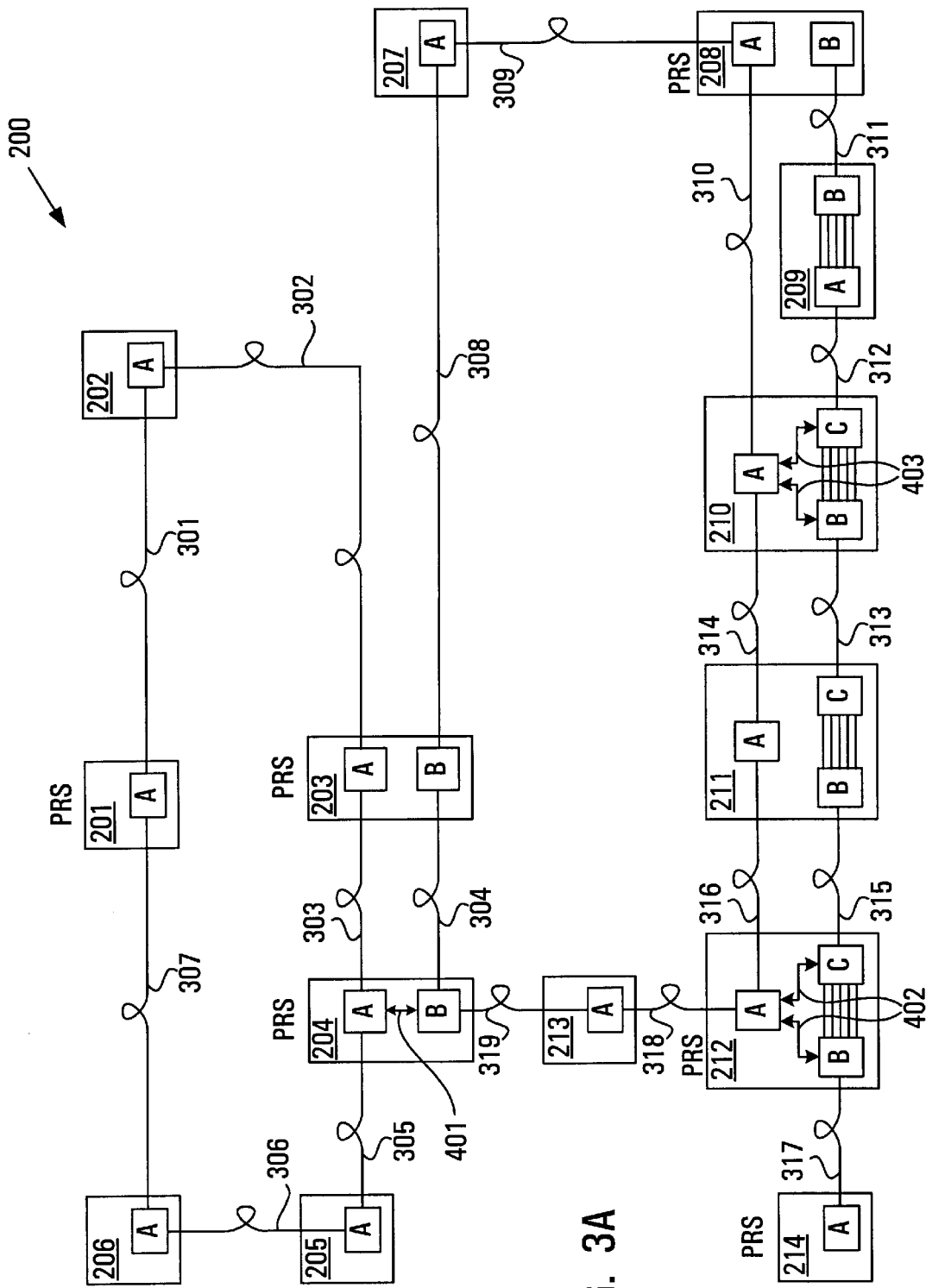
FIG. 3A shows the network of FIG. 2 with PRS clocks placed at selected sites in accordance with the present invention.

FIG. 3A shows the distribution of PRS clocks placed at selected sites (as indicated by "PRS" symbols) in accordance with STEP I of the present invention. A site comprising a PRS clock is aptly named a "PRS site", and, as already mentioned, a site not comprising a PRS clock is referred to as an "intermediate site".

According to STEP I, therefore, and with reference to FIG. 3A, the installation of a PRS clock at a given site can be mandatory or desirable. It is required when the number of independent PTRs is not equal to two. This obviously includes sites which have only one PTR (e.g., site 214) as well as sites which have three or more independent PTRs (e.g., sites 204, 212). PRS clocks are not mandatorily placed at the remaining sites, which have exactly two independent PTRs.

It is to be understood that it is possible for a site to have two PTRs but which come from the same general direction, as would be the case with site 208 if segment 309 did not exist. In that case, site 208 would have access to only one independent timing reference, forcing the installation of a PRS clock in accordance with the present invention.

If, however, a given site has access to exactly two independent potential timing references, then placement of a PRS is still considered, being preferable if the site is considered significant for strategic business reasons. For instance, a site providing services to a large number of important business customers is eligible to become a PRS site, as is a site which would help shorten an extremely long chain of intermediate sites.

Accordingly, in the example network 200 in FIG. 3A, placement of an additional PRS clock would be preferable at site 201, minimizing the number of intermediate sites in the arc between site 201 and both of sites 203 and 204 already comprising respective mandatory PRS clocks. Also, if it is determined, for example, that site 208 is serving strategic customers, then it would be seriously impacted by a synchronization failure, prompting the placement of a PRS clock at this site, as illustrated in FIG. 3A.

STEP II: Selection of the Sites at Which BITSes are to be Installed

Figure 3B:
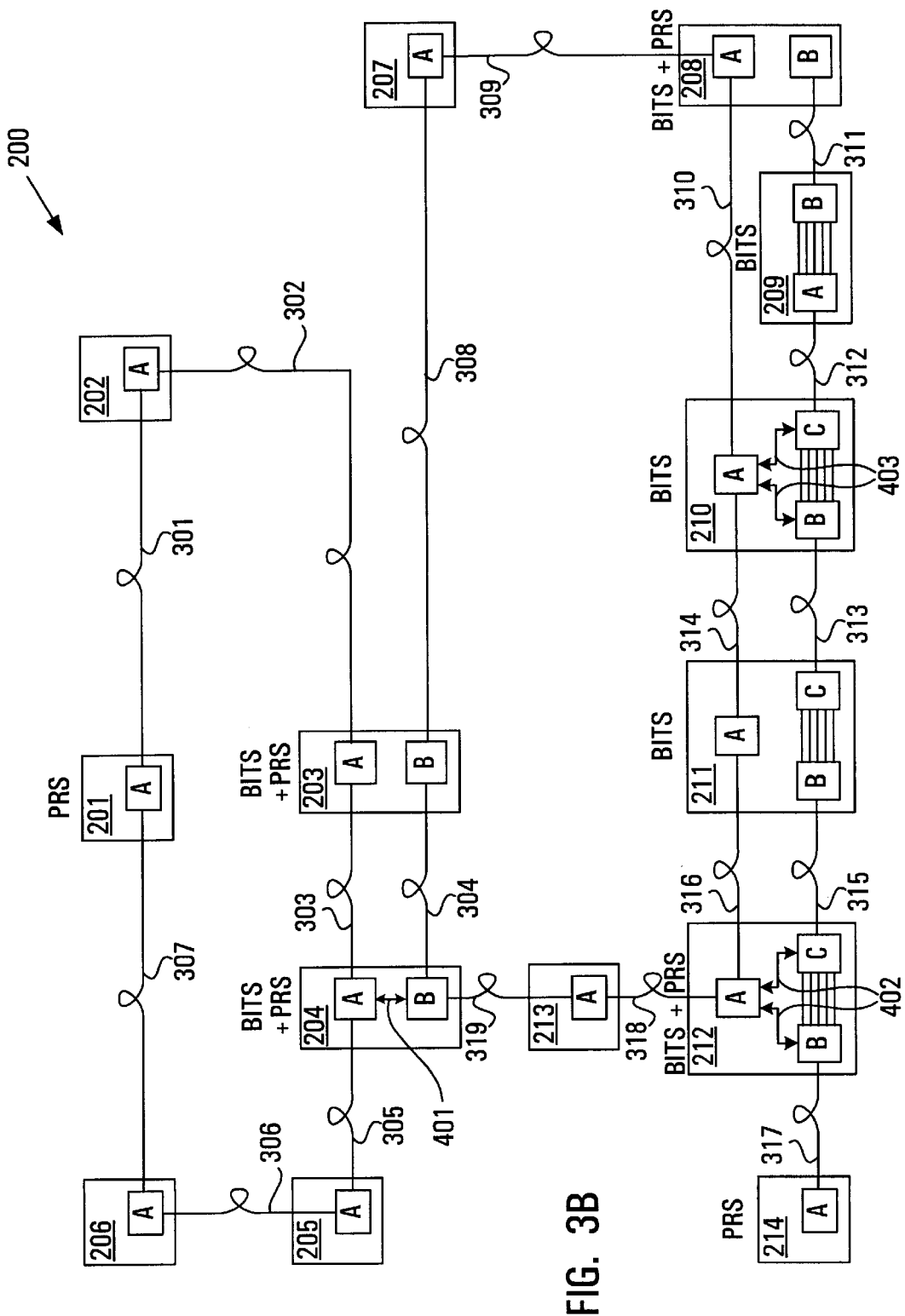
FIG. 3B shows the network of FIG. 4A with BITSes placed at selected sites in accordance with the present invention.

In addition to showing the PRS clocks installed in accordance with STEP I, FIG. 3B indicates by means of a "BITS" symbol the sites in the example network 200 at which respective BITSes are required to be installed in accordance with the inventive method. An intermediate site comprising a BITS is aptly named an "intermediate BITS site" and a PRS site with a BITS is called a "PRS BITS site".

Specifically, a BITS is to be deployed at a given site if there are (or are expected to be) two or more network elements physically located at that site. It follows that in the example network 200, BITSes are to be deployed at PRS sites 203, 204, 208 and 212, making them "PRS BITS sites". Similarly, BITSes are to be installed at intermediate sites 209, 210, 211, making them "intermediate BITS sites".

For each PRS BITS site, the inventive method simply requires that the ST1 PRS clock becomes the reference for the BITS. On the other hand, for intermediate BITS sites, the quality required of timing signal supplied by the BITS is preferably determined according to the (possibly expected) requirement that the site provide DS1 termination or synchronization for customers. If this is the case, a stratum 2 clock is to be deployed; otherwise, it is acceptable to use a stratum 3E clock. In either case, the BITS at an intermediate BITS site will rely on two timing inputs from the available PTRs.

STEP III: At Each Intermediate Site, Selection of Two Synchronization References From the Available PTRs and Selecting the NE's That Require SSM Enabling The third step of the inventive method is most easily described by introducing the notions of an inter-PRS span and a synchronization distribution path, or "SDP". An inter-PRS span can be defined as the collection of (intermediate) sites and interconnecting segments which are located between two PRS sites. An example of an inter-PRS span can be found in FIGS. 3A and 3B, between PRS sites 212 and 208, consisting of sites 209, 210 and 211, as well as segments 310–316.

Figure 4A:
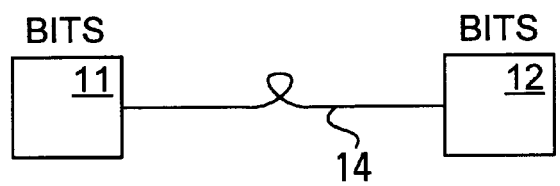
FIGS. 4A to 4C help to illustrate the concept of a synchronization distribution path (SDP)

An SDP can be defined as a path belonging to a system (ring ADM, linear ADM, linear point-to-point, etc.) which exists between two adjacent intermediate BITS sites or PRS BITS sites for potentially delivering synchronization. An SDP can be either bidirectional or unidirectional, and is more suitably illustrated by way of FIGS. 4A to 4C. Specifically, FIG. 4A shows two intermediate BITS sites 11,12 connected as a linear point-to-point system by a fiber optic segment 14, which forms a bidirectional SDP delivering timing from one intermediate BITS site to the other. If site 11 were a PRS BITS site, then synchronization would only be deliverable from site 11 to site 12, and the SDP associated with segment 14 would be classified as unidirectional.

Figure 4B:
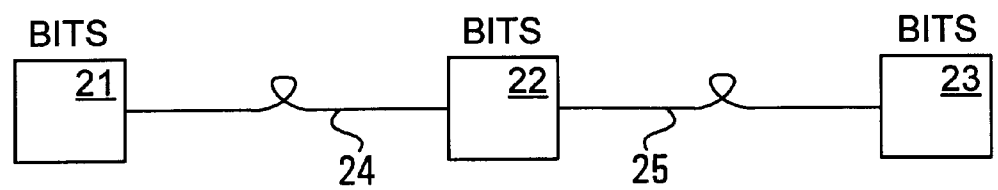

In FIG. 4B, there are shown three intermediate BITS sites 21,22,23 arranged as a linear ADM system or as part of a ring ADM system. There is a first bidirectional SDP between intermediate BITS sites 21 and 22 formed by a fiber optic segment 24 and a second bidirectional SDP between intermediate BITS sites 22 and 23 formed by a fiber optic segment 25. If site 22 were a PRS BITS site, then both SDPs would reduce to unidirectional ones. If only site 23 were a PRS site, then the SDP associated with segment 25 would reduce to a unidirectional one, while the SDP associated with segment 24 would remain bidirectional.

Figure 4C:
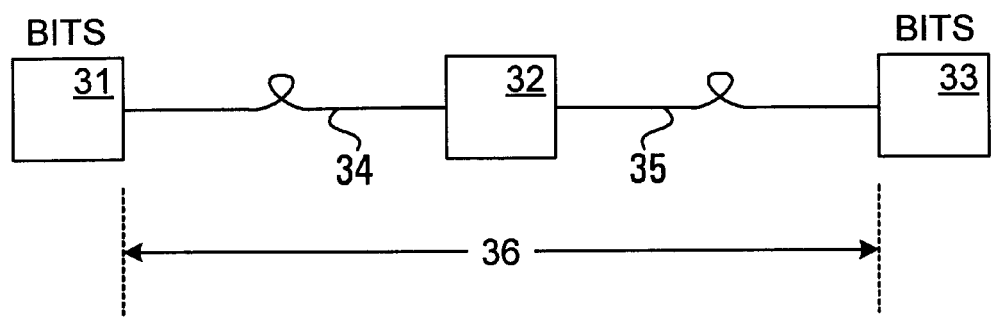

In FIG. 4C, there is shown a linear ADM system or part of a ring ADM system comprising three intermediate sites 31,32,33 interconnected by fiber optic segments 34,35. Among intermediate sites 31–33, only sites 31 and 33 are also intermediate BITS sites. Site 32 is void of a BITS and comprises a line-timed or through-timed network element. While there are certainly two PRTs available at site 32, derivable from data arriving on segments 34 and 35, these are part of the same bidirectional SDP 36 formed between the two intermediate BITS sites 31 and 33. With respect to directionality, the SDP 36 can be rendered unidirectional if a PRS clock is installed at either intermediate BITS site 31,33. On the other hand, if a PRS clock were installed at site 32, then the SDP 36 would be broken into two individual unidirectional SDPs.

Having defined what is meant by an inter-PRS span and a unidirectional or bidirectional SDP, it now is appropriate to break down STEP III of the present invention, which is concerned with selecting the two timing references (primary/secondary) for each intermediate site from among all the SDPs available at that site and also with enabling selected network elements with SSM. By administering STEP III, the number of network elements that need to be provided with SSM functionality is minimized, while the risk of creating timing loops is eliminated.

Figure 5:
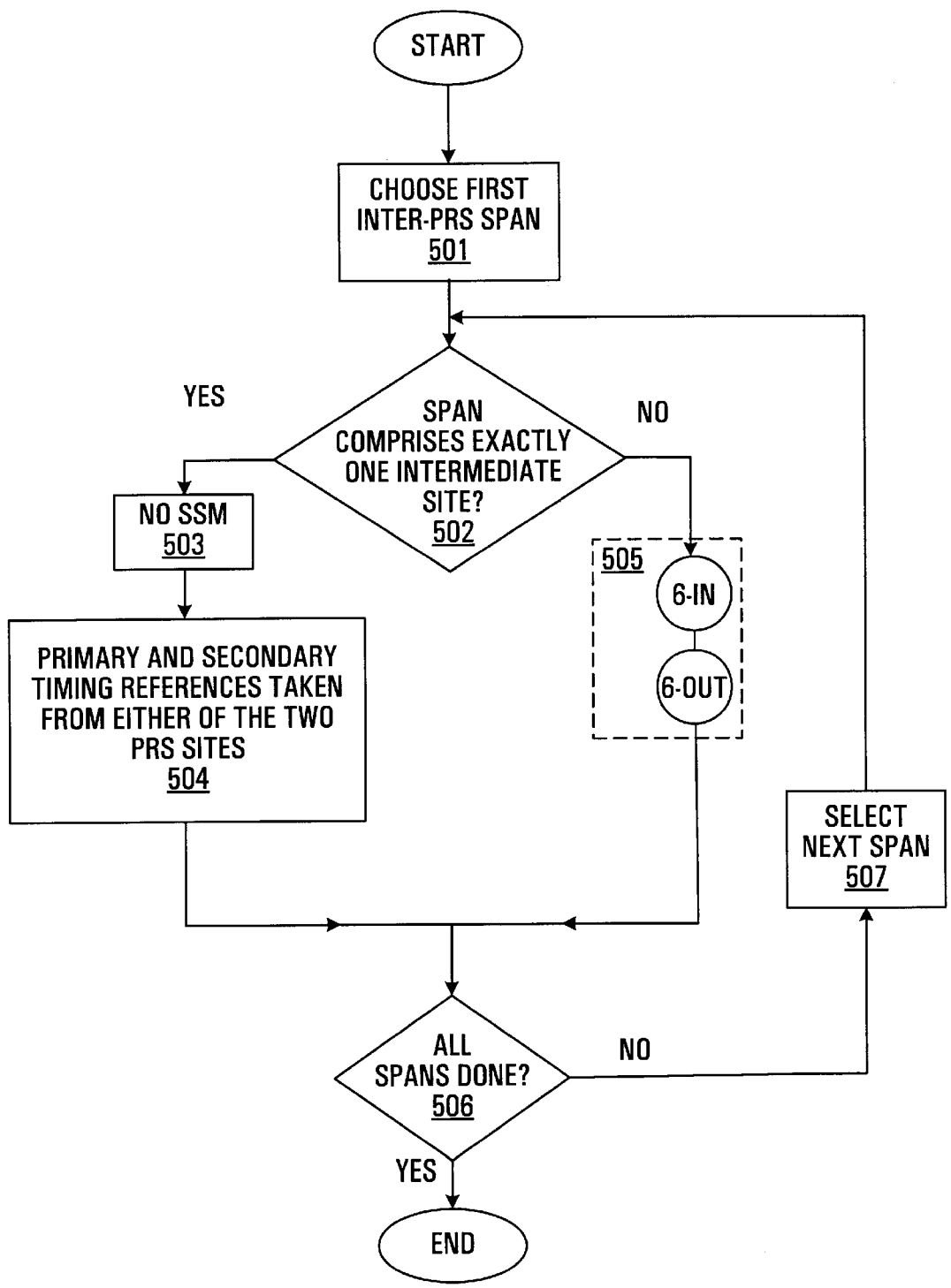
FIG. 5 is a flowchart describing timing distribution to intermediate sites in accordance with the present invention.

The execution of STEP III is best illustrated by referring to the flowchart in FIG. 5, which begins in box 501 with the consideration of a first inter-PRS span. The next step (box 502) determines whether the span being considered comprises exactly one intermediate site. If so, then two (independent) PRS clocks are available to this lone site, in which case the enabling of SSM at this site is not required (box 503). Next, the primary and secondary timing references for this site, which may or may comprise a BITS, are chosen arbitrarily from between the two neighbouring PRS sites (box 504).

Figure 6:
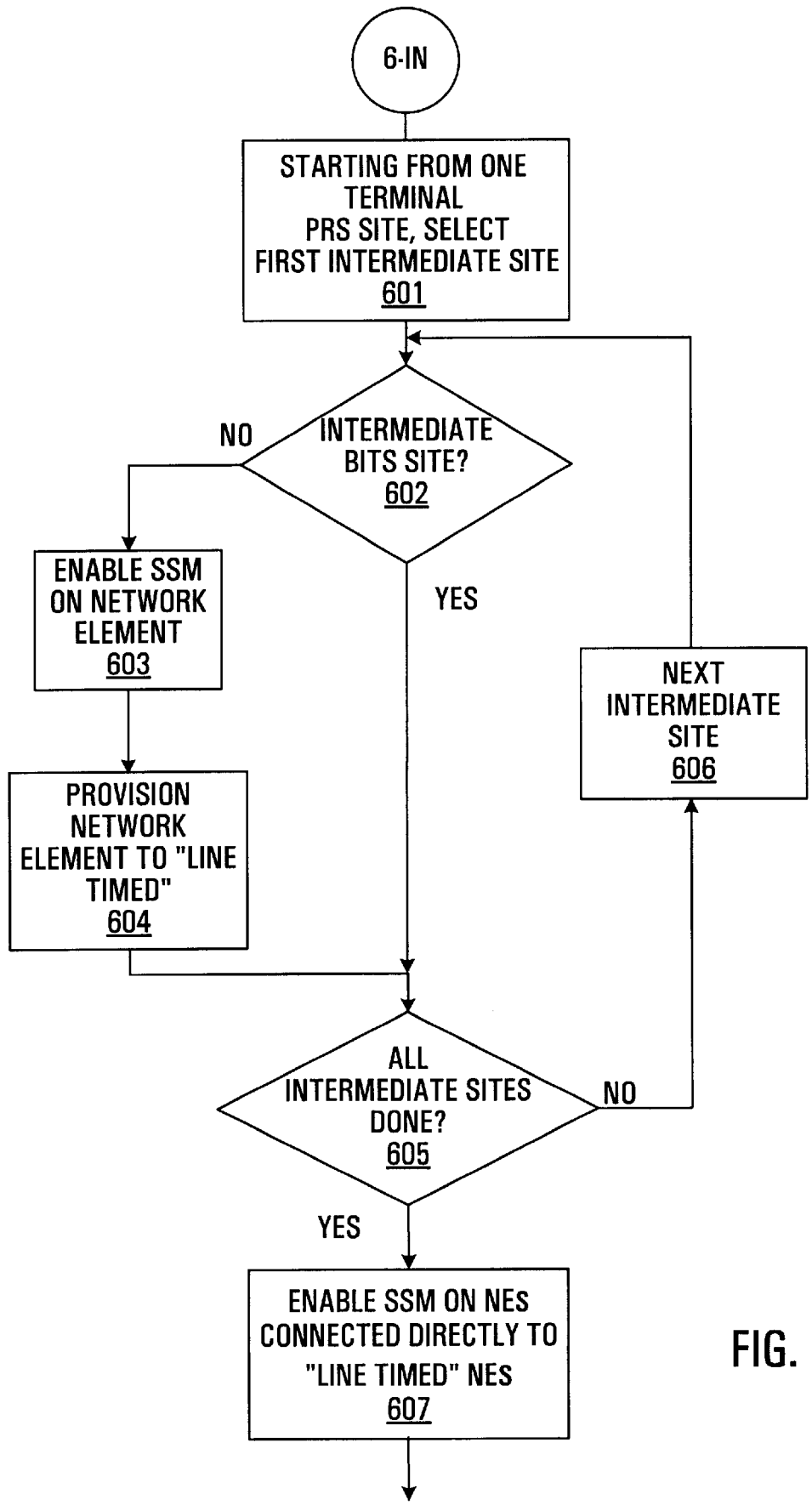
FIG. 6 is a flowchart expanding box 505 from FIG. 5.
Figure 6:
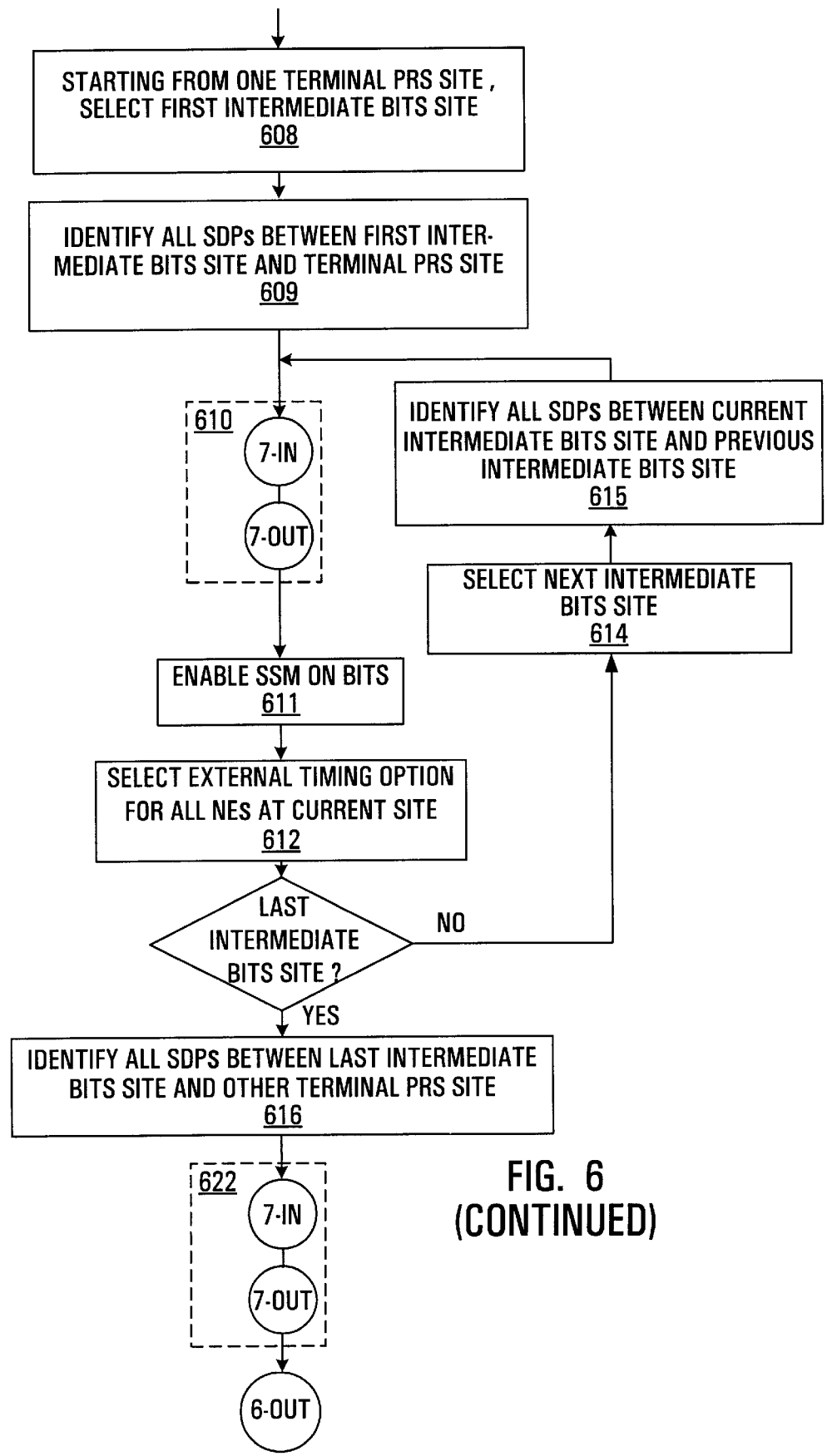

However, in most cases, there will be more than one intermediate site in the inter-PRS span, and in this case (the "NO" path following box 502), the present invention calls for a slightly more sophisticated selection algorithm to be applied (box 505), which is illustrated in more detail in FIG. 6.

Specifically, with reference to FIG. 6, the first intermediate site from either PRS site terminating the inter-PRS span is considered (box 601). Box 602 determines whether or not the intermediate site is equipped with a BITS. If not, then the implication is that only one network element is present at that site, and its software or firmware is to be SSM-enabled (box 603). As for timing derivation, box 604 instructs the network element to take its primary and secondary timing references from its two available PRTs emanating from adjacent sites, i.e., the network element is "line timed" or, in the case of a regenerator, "through timed".

Box 605 determines whether there are any further intermediate sites to be considered and if so, box 606 requires that a new intermediate site be considered. The loop consisting of boxes 602–605 is performed on the new intermediate site, and the procedure continues until it is determined in box 605 that all intermediate sites in the inter-PRS span have been considered. Box 607 then dictates that SSM should also be enabled at all network elements (in adjacent sites) connected directly to any line or through timed network elements.

(In certain cases, box 607 may cause some overlap with previous execution of box 603. For example, when none of the intermediate sites in the inter-PRS span are intermediate BITS sites, these sites will already be enabled with SSM according to box 603 prior to execution of box 607, which will require that these same network elements be enabled with SSM. This is not inconsistent, and simply serves to cover all possible combinations of network element interconnections.)

Continuing with box 608, the first intermediate BITS site from one of the terminal PRS sites of the inter-PRS span is considered. (This PRS site need not be identical to the one chosen in box 601.) The next step (box 609) is to identify all SDPs between the current intermediate BITS site and the newly chosen PRS site. Such SDPs will be unidirectional, and effectively represent the number of PTRs originating from the PRS site and available to the first intermediate BITS site. One of the two timing inputs to the BITS at the first intermediate BITS site will be chosen from only one of these SDPs.

Figure 7:
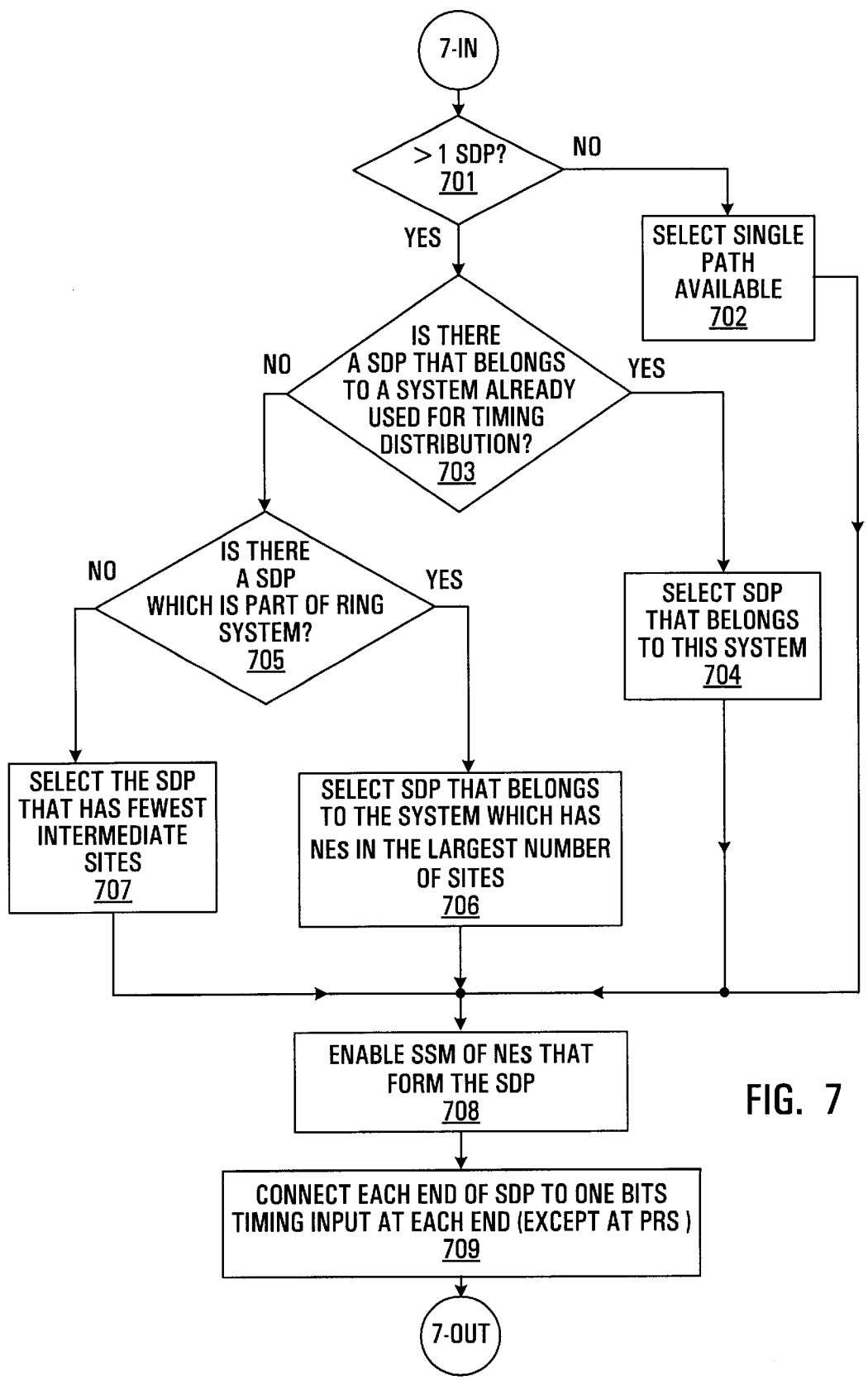
FIG. 7 is a flowchart expanding boxes 610 and 622 from FIG. 6.

To ensure that only one such SDP is drawn from by the intermediate BITS site in question, box 610 applies a technique that is further described in FIG. 7. With reference to FIG. 7, therefore, box 701 performs a basic check to see whether there is in fact more than one available synchronization distribution path. If not, if there is only one SDP, then obviously that path is selected (box 702) as the timing input to the BITS at the first intermediate BITS site.

When there are multiple SDPs leading from the chosen PRS site to the BITS still in question, box 703 determines whether or not one of the paths belongs to a system (ring or linear point-to-point) that is already being used for timing distribution. For the first intermediate BITS site to be considered, there is no such path.

Accordingly, the flowchart leads to box 705, which determines whether one or more of the SDPs is part of a ring system. If so, box 706 indicates that the SDP selected to provide the first of two timing references to the first intermediate BITS site is the one which belongs to the ring system with network elements in the largest number of sites. If not, box 707 dictates that the desired SDP is to be chosen as the one which belongs the system comprising the fewest network elements between the current intermediate BITS site and the previous intermediate BITS site (or PRS site, if applicable). In the case of a linear point-to-point system with no intervening regenerators, for example, this number will be equal to two. In the case of a "tie" any one of the SDPs which meet the selection criteria may be chosen as the one used by the intermediate BITS site as the first timing input to the corresponding BITS.

Following the selection of the synchronization distribution path to be used by the intermediate BITS site, box 708 requires that SSM is to be enabled on all network elements that form this path. (This may cause some overlap with box 607 in FIG. 6 if the network element being enabled with SSM has already been so enabled because it is connected to a line timed or through timed network element.)

Still in relation to the first intermediate BITS site in the first inter-PRS span, the last step in FIG. 7 provides, in box 709, connection of the DS1 timing signal derived from one end of the SDP to one of the two BITS timing inputs of the intermediate BITS site in question. (At the other end of the unidirectional SDP is the chosen terminating PRS site and since a PRS clock does not require a timing reference input, there is no need to derive a DS1 timing signal from the SDP at this end.)

At this point, box 610 in FIG. 6 is complete, and the next step is to enable SSM on the BITS itself (box 611) and to select the external timing option for all network elements at the intermediate BITS site (box 612). The latter step simply ensures that the network elements receive their timing from the BITS. Next, it is determined whether or not there is at least one more intermediate BITS site in the inter-PRS span (box 613) and if so, to proceed with the next intermediate BITS site (box 614).

In box 615, it is necessary to determine all SDPs between the newly selected intermediate BITS site and the previous intermediate BITS site, the SDPs being bidirectional. Next, steps 610–612 are followed exactly as when the first intermediate BITS site was considered, although the path taken through FIG. 7 may be slightly different. Most notably, the answer to the question posed in box 703 may be "yes", i.e., there may actually be an SDP belonging to a system that is already being used for timing distribution. In that case, box 704 would dictate that the SDP corresponding to this system be chosen as the SDP used by the intermediate BITS site currently under consideration, thereby to reduce the number of network elements that would require SSM support and reduce the overall cost of synchronization distribution.

Another difference in flow will be encountered when passing through box 709, since neither end of the SDP will in general be a PRS site, and therefore a DS1 timing signal derived from the SDP by sites located at either end of the SDP will be connected to one of the two timing inputs of the corresponding BITS.

Finally, once it is determined in box 613 that the last intermediate BITS site in the first inter-PRS span has been considered, timing will have been distributed in both directions between one of the PRS sites and all BITSes in the inter-PRS span. However, there remains the final selection of a timing reference from the other PRS site to the last intermediate BITS site. To this end, box 616 requires the identification of all (unidirectional) SDPs between the last intermediate BITS site and the other PRS site. In box 622, the chosen SDP is determined in a manner identical to the procedure outlined in FIG. 7 and already used in box 610. As provided by box 709 in FIG. 7, it will obviously not be necessary to connect the chosen SDP to any timing inputs at the second PRS site.

At this point, the flowchart in FIG. 6 is complete and further description of the flow of the inventive method continues with reference to FIG. 5. Specifically, having now selected which two from the possible plurality of SDPs are to be used by each intermediate site in an inter-PRS span, it is verified whether all inter-PRS spans have been considered (box 506). If not, the next such span is considered (box 507), and the inventive procedure is reapplied, starting with box 502 in exactly the same way as previously described.

Of course, after each and every inter-PRS span has been considered, the answer to the question in box 506 is "YES" and the synchronization distribution algorithm in FIG. 5 ends. Each intermediate site in the entire network now has two timing references and STEP III of the inventive method is complete.

Figure 8:
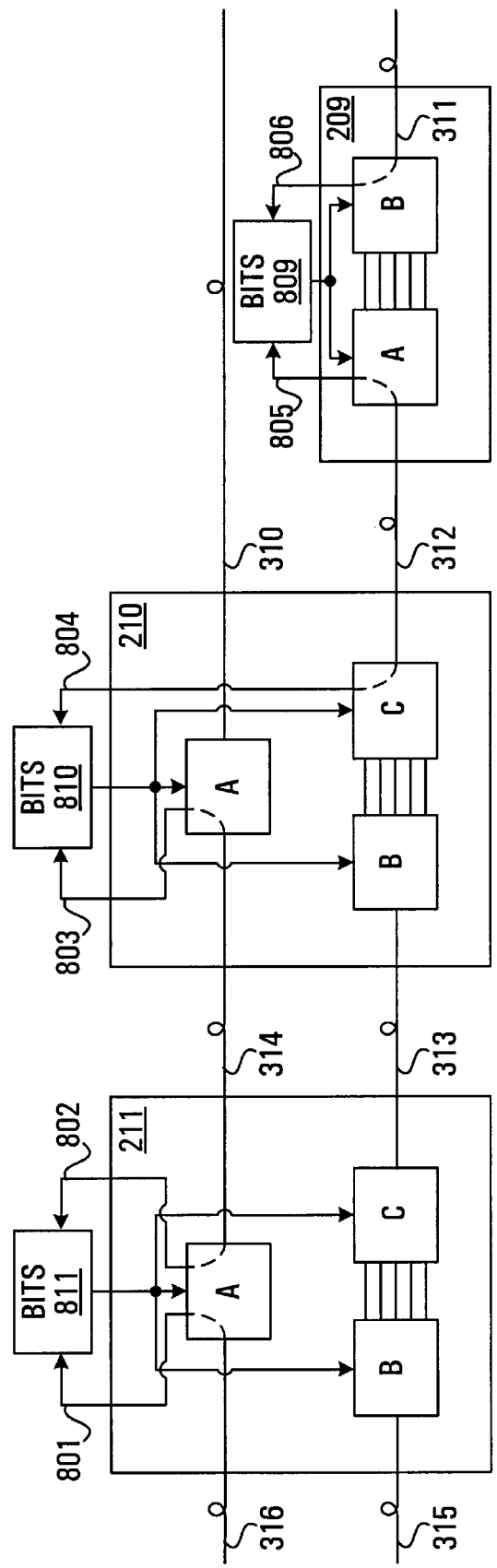
FIG. 8 illustrates application of the inventive method to an inter-PRS span from FIG. 3B.

As an example of how the inventive method is applied, it is useful to refer to FIG. 3B and to the inter-PRS span between PRS sites 208 and 212 consisting of sites 209–211 and segments 310–316. FIG. 8 illustrates this inter-PRS span, as well as the BITSes 809–811 used for distributing timing to sites 209–211, respectively. By first considering site 211, it is observed that it is an intermediate BITS site, and that there exist two (unidirectional) SDPs leading from PRS site 212, as formed by segments 315, 316.

According to box 706 in FIG. 7, the selected SDP is the one formed by segment 316, i.e., it is associated with the ring system having network elements in the largest number of sites. Subsequently, according to box 709, the BITS timing input 801 of the BITS 811 at site 211 is derived from the chosen SDP.

Next, considering intermediate BITS site 210, box 703 dictates that the chosen SDP be associated with segment 314, as both segments belong to the same ring system. Box 709 then dictates that the first BITS timing input 803 to the BITS 810 at site 210 and that the second BITS timing input 802 to the BITS 811 at site 211 be derived from the chosen SDP.

The following step involves consideration of site 209, which is also happen to be an intermediate BITS site. Here, box 702 dictates that the only available SDP be used, namely, the one associated with segment 312. Thus, box 709 indicates that the first BITS timing input 805 to the BITS 809 at site 209 and that the second BITS timing input 804 to the bits 810 at site 210 be derived from this chosen SDP. Finally, the second BITS timing input 806 to the BITS 809 at site 209 is derived from the SDP selected according to boxes 616 and 702 as the one associated with segment 311.

It is then left as a simple exercise for the network system designer to establish the initial synchronization distribution configuration by assigning one of the two timing references as the primary and the other as the secondary. This can be done on the basis of proximity from the PRS, for example, for an inter-PRS span comprised of 6 intermediate sites arranged along an east-west axis, the 3 "eastern" intermediate sites would be getting their primary reference from the east-end PRS clock, while the other 3 intermediate sites would get their primary reference from the west-end PRS clock. It is understood, however, that due to the use of SSM, this initial configuration may change as faults occur on the fiber segments and synchronization distribution becomes rearranged under SSM control. However, by having applied the inventive design methodology described herein, timing loops will not be created.

While the preferred embodiment of the present invention has been described and illustrated, it will be apparent to one skilled in the art that numerous modifications and variations are possible. The scope of the invention, therefore, is only to be limited by the claims appended hereto.

We claim:

1. A method of synchronizing a communications network having a plurality of interconnected sites, each site comprising at least one network element and being connected to at least one other site via a respective network segment providing a potential timing reference (PTR) for the site, the method comprising the steps of:

(1) selecting the sites at which to deploy a primary reference source (PRS) clock, including at least those sites having exactly one PTR or having three or more independent PTRs;

(2) selecting the sites at which to install a building integrated timing supply (BITS);

(3) for each site not comprising a PRS, selecting one of the respective PTRs as a primary timing reference and selecting another of the respective PTRs as a secondary timing reference for the site; and (4) selecting the sites at which to enable synchronization status messaging (SSM).

2. A method according to claim 1, wherein step (1) further comprises:

installing a PRS clock at sites located a significant distance away from all other sites equipped with a PRS clock.

3. A method according to claim 1, wherein step (1) further comprises:

installing a PRS clock at sites comprising sensitive digital equipment.

4. A method according to claim 1, wherein step (2) includes installing a building integrated timing supply (BITS) at each site comprising more than one network element and having more than one PTR.

5. A method according to claim 4, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein step (3) consists of the following sub-steps:

(3A) for each PRS BITS site, both BITS timing inputs being connected to the PRS clock;

(3B) for each intermediate BITS site having two or more PTRs, selecting two of the PTRs as "chosen PTRs", if possible, the chosen PTRS being independent PTRs, connecting one timing input of the corresponding BITS to a timing reference output derived from one of the chosen PTRs by a first network element at the intermediate BITS site and connecting the other timing input of the corresponding BITS to a timing reference output derived from the other of the chosen PTRs by a second network element at the intermediate BITS site;

(3C) enabling SSM at all network elements of each site not located adjacent to two PRS sites; and (3D) for each site comprising a BITS and not located adjacent to two PRS sites, enabling SSM at said BITS.

6. A method according to claim 1, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein step (3) consists of the following sub-steps:

(3A) for each PRS BITS site, both BITS timing inputs being connected to the PRS clock;

(3B) for each intermediate BITS site having two or more PTRs, selecting two of the PTRs as "chosen PTRs", if possible, the chosen PTRs being independent PTRs, connecting one timing input of the corresponding BITS to a timing reference output derived from one of the chosen PTRs by a first network element at the intermediate BITS site and connecting the other timing input of the corresponding BITS to a timing reference output derived from the other of the chosen PTRs by a second network element at the intermediate BITS site;

(3C) enabling SSM at all network elements of each site not located adjacent to two PRS sites; and (3D) for each site comprising a BITS and not located adjacent to two PRS sites, enabling SSM at said BITS.

7. A method according to claim 6, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein step (3) consists of the following sub-steps:

(3A) enabling synchronization status messaging (SSM) at the BITS of an intermediate BITS site not located between two sites having respective PRS clocks;

(3B) at a PRS BITS site, connecting the timing inputs of the corresponding BITS to the corresponding PRS clock;

(3C) enabling SSM at selected ones of the network elements according to a procedure comprising, for all inter-PRS spans having more than one intermediate site:

(3C-1) determining first and second terminal PRS sites of the current inter-PRS span;

(3C-2) selecting a first intermediate site in the inter-PRS span, calling it the "current intermediate site"

(3C-3) if the current intermediate site is not an intermediate BITS site, enabling SSM on all network elements at said current intermediate site;

(3C-4) if possible, selecting another intermediate site in the inter-PRS span, calling it the "current intermediate site";

(3C-5) repeating steps (3C-3) and (3C-4) until all intermediate sites in the inter-PRS span have been considered;

(3C-6) identifying all synchronization distribution paths (SDPs) between the first terminal PRS site and a first intermediate BITS site in the inter-PRS span, called the "current intermediate BITS site", each SDP having two ends, one of which is connected to a respective first network element at the current intermediate BITS site and the other of which is connected to a respective second network element at the first terminal PRS site;

(3C-7) if there is exactly one such SDP, designating that SDP as the "chosen SDP"; otherwise, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;

(3C-8) enabling SSM at the first and second network elements associated with the chosen SDP; and connecting one of the BITS timing inputs at the current intermediate BITS site to a timing reference output by the first network element;

(3C-9) renaming the current intermediate BITS site the "previous intermediate BITS site" and, if possible, selecting another intermediate BITS site in the inter-PRS span, calling it the "current intermediate BITS site";

(3C-10) identifying all SDPs between the current intermediate BITS site and the previous intermediate BITS site in the inter-PRS span, each SDP having two ends, one of which is connected to a respective first network element at the current intermediate BITS site and the other of which is connected to a respective second network element at the previous intermediate BITS site;

(3C-11) if there is exactly one such SDP, designating that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;

(3C-12) enabling SSM at the first and second network elements associated with the chosen SDP; connecting one of the BITS timing inputs at the current intermediate BITS site to a timing reference output by the first network element; and connecting one of the BITS timing inputs at the previous intermediate BITS site to a timing reference output by the second network element;

(3C-13) repeating steps (3C-9), (3C-10), (3C-11) and (3C-12) until the last intermediate BITS site in the inter-PRS span has been considered;

(3C-14) identifying all SDPs between the current intermediate BITS site and the second terminal PRS site, each SDP having two ends, one of which is connected to a respective first network element at the current intermediate BITS site and the other of which is connected to a respective second network element at the second terminal PRS site;

(3C-15) if there is exactly one such SDP, designating that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements; and (3C-16) enabling SSM at the first and second network elements associated with the chosen SDP; and connecting one of the BITS timing inputs at the current intermediate BITS site to a timing reference output by the first network element.

8. A method according to claim 1, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein step (3) consists of the following sub-steps:

(3A) enabling synchronization status messaging (SSM) at the BITS of an intermediate BITS site not located between two sites having respective PRS clocks;

(3B) at a PRS BITS site, connecting the timing inputs of the corresponding BITS to the corresponding PRS clock;

(3C) enabling SSM at selected ones of the network elements according to a procedure comprising, for all inter-PRS spans having more than one intermediate site:

(3C-1) determining first and second terminal PRS sites of the current inter-PRS span;

(3C-2) selecting a first intermediate site in the inter-PRS span, calling it the "current intermediate site"

(3C-3) if the current intermediate site is not an intermediate BITS site, enabling SSM on all network elements at said current intermediate site;

(3C-4) if possible, selecting another intermediate site in the inter-PRS span, calling it the "current intermediate site";

(3C-5) repeating steps (3C-3) and (3C-4) until all intermediate sites in the inter-PRS span have been considered;

(3C-6) identifying all synchronization distribution paths (SDPs) between the first terminal PRS site and a first intermediate BITS site in the inter-PRS span, called the "current intermediate BITS site", each SDP having two ends, one of which is connected to a respective first network element at the current intermediate BITS site and the other of which is connected to a respective second network element at the first terminal PRS site;

(3C-7) if there is exactly one such SDP, designating that SDP as the "chosen SDP"; otherwise, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;

(3C-8) enabling SSM at the first and second network elements associated with the chosen SDP; and connecting one of the BITS timing inputs at the current intermediate BITS site to a timing reference output by the first network element;

(3C-9) renaming the current intermediate BITS site the "previous intermediate BITS site" and, if possible, selecting another intermediate BITS site in the inter-PRS span, calling it the "current intermediate BITS site";

(3C-10) identifying all SDPs between the current intermediate BITS site and the previous intermediate BITS site in the inter-PRS span, each SDP having two ends, one of which is connected to a respective first network element at the current intermediate BITS site and the other of which is connected to a respective second network element at the previous intermediate BITS site;

(3C-11) if there is exactly one such SDP, designating that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;

(3C-12) enabling SSM at the first and second network elements associated with the chosen SDP; connecting one of the BITS timing inputs at the current intermediate BITS site to a timing reference output by the first network element; and connecting one of the BITS.

9. A method according to claim 1, wherein the network is divided into an arrangement of ring systems and linear systems, and wherein at least one of the systems is a local exchange carrier.

10. A method according to claim 1, wherein the network is divided into an arrangement of ring systems and linear systems, and wherein at least one of the systems is an inter-exchange carrier.

11. A method according to claim 1, wherein the network is a fiber network employing an optical transmission standard chosen from the set of SONET and SDH.

12. A method according to claim 1, wherein the two BITS timing inputs of each BITS are termed primary and secondary timing references, the primary timing reference being selected as the timing reference derived from the PTR closest to a PRS site.

13. A computer readable storage medium having computer readable program code means embodied therein for causing a computing device to synchronize a communications network having a plurality of interconnected sites, each site comprising at least one network element and being connected to at least one other site via a respective network segment providing a potential timing reference (PTR) for the site, the computer readable program code means in said article of manufacture comprising:

computer readable program code means for causing the computer to execute a first step comprising selecting the sites at which to deploy a primary reference source (PRS) clock, including at least those sites having exactly one PTR or having three or more independent PTRs;

computer readable program code means for causing the computer to execute a second step comprising selecting the sites at which to install a building integrated timing supply (BITS);

computer readable program code means for causing the computer to execute a third step comprising selecting, for each site not comprising a PRS, one of the respective PTRs as a primary timing reference and another of the respective PTRs as a secondary timing reference for the site; and computer readable program code means for causing the computer to execute a fourth step comprising selecting the sites at which to enable synchronization status messaging (SSM).

14. The computer-readable storage medium of claim 13, wherein the second step includes installing a building integrated timing supply (BITS) at each site comprising more than one network element and having more than one PTR.

15. The computer-readable storage medium of claim 14, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein the third step consists of the following sub-steps:

(3A) for each PRS BITS site, connecting both BITS timing inputs to the PRS clock;

(3B) for each intermediate BITS site having two or more PTRs, selecting two of the PTRs as "chosen PTRs", if possible, the chosen PTRs being independent PTRs, connecting one timing input of the corresponding BITS to a timing reference output derived from one of the chosen PTRs by a first network element at the intermediate BITS site and connecting the other timing input of the corresponding BITS to a timing reference output derived from the other of the chosen PTRs by a second network element at the intermediate BITS site;

(3C) enabling SSM at all network elements of each site not located adjacent to two PRS sites; and (3D) for each site comprising a BITS and not located adjacent to two PRS sites, enabling SSM at said BITS.

16. The computer-readable storage medium of claim 15, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein the third step consists of the following sub-steps:

(3A) enabling synchronization status messaging (SSM) at the BITS of an intermediate BITS site not located between two sites having respective PRS clocks;

(3B) at a PRS BITS site, connecting the timing inputs of the corresponding BITS to the corresponding PRS clock;

(3C) enabling SSM at selected ones of the network elements according to a procedure comprising, for all inter-PRS spans having more than one intermediate site:

(3C-1) determining first and second terminal PRS sites of the current inter-PRS span;

(3C-2) selecting a first intermediate site in the inter-PRS span, calling it the "current intermediate site"

(3C-3) if the current intermediate site is not an intermediate BITS site, enabling SSM on all network elements at said current intermediate site;

(3C-4) if possible, selecting another intermediate site in the inter-PRS span, calling it the "current intermediate site";

(3C-5) repeating steps (3C-3) and (3C-4) until all intermediate sites in the inter-PRS span have been considered;

(3C-6) identifying all synchronization distribution paths (SDPs) between the first terminal PRS site and a first intermediate BITS site in the inter-PRS span, called the "current intermediate BITS site", each SDP having two ends, one of which is connected to a respective first network element at the current intermediate BITS site and the other of which is connected to a respective second network element at the first terminal PRS site;

(3C-7) if there is exactly one such SDP, designating that SDP as the "chosen SDP"; otherwise, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;

(3C-8) enabling SSM at the first and second network elements associated with the chosen SDP; and connecting one of the BITS timing inputs at the current intermediate BITS site to a timing reference output by the first network element;

(3C-9) renaming the current intermediate BITS site the "previous intermediate BITS site" and, if possible, selecting another intermediate BITS site in the inter-PRS span, calling it the "current intermediate BITS site";

(3C-10) identifying all SDPs between the current intermediate BITS site and the previous intermediate BITS site in the inter-PRS span, each SDP having two ends, one of which is connected to a respective first network element at the current intermediate BITS site and the other of which is connected to a respective second network element at the previous intermediate BITS site;

(3C-11) if there is exactly one such SDP, designating that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;

(3C-12) enabling SSM at the first and second network elements associated with the chosen SDP; connecting one of the BITS timing inputs at the current intermediate BITS site to a timing reference output by the first network element; and connecting one of the BITS timing inputs at the previous intermediate BITS site to a timing reference output by the second network element;

(3C-13) repeating steps (3C-9), (3C-10), (3C-11) and (3C-12) until the last intermediate BITS site in the inter-PRS span has been considered;

(3C-14) identifying all SDPs between the current intermediate BITS site and the second terminal PRS site, each SDP having two ends, one of which is connected to a respective first network element at the current intermediate BITS site and the other of which is connected to a respective second network element at the second terminal PRS site;

(3C-15) if there is exactly one such SDP, designating that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements; and (3C-16) enabling SSM at the first and second network elements associated with the chosen SDP; and connecting one of the BITS timing inputs at the current intermediate BITS site to a timing reference output by the first network element.

17. The computer-readable storage medium of claim 13, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein the third step consists of the following sub-steps:

(3A) for each PRS BITS site, connecting both BITS timing inputs to the PRS clock;

(3B) for each intermediate BITS site having two or more PTRs, selecting two of the PTRs as "chosen PTRs", if possible, the chosen PTRs being independent PTRs, connecting one timing input of the corresponding BITS to a timing reference output derived from one of the chosen PTRs by a first network element at the intermediate BITS site and connecting the other timing input of the corresponding BITS to a timing reference output derived from the other of the chosen PTRs by a second network element at the intermediate BITS site;

(3C) enabling SSM at all network elements of each site not located adjacent to two PRS sites; and (3D) for each site comprising a BITS and not located adjacent to two PRS sites, enabling SSM at said BITS.

18. The computer-readable storage medium of claim 13, wherein sites comprising a PRS clock are called "PRS sites", wherein PRS sites comprising a BITS are further called "PRS BITS sites", wherein sites not comprising a PRS clock are called "intermediate sites", wherein intermediate sites comprising a BITS are further called "intermediate BITS sites", wherein each BITS has two timing inputs and wherein the third step consists of the following sub-steps:

(3A) enabling synchronization status messaging (SSM at the BITS of an intermediate BITS site not located between two sites having respective PRS clocks;

(3B) at a PRS BITS site, connecting the timing inputs of the corresponding BITS to the corresponding PRS clock;

(3C) enabling SSM at selected ones of the network elements according to a procedure comprising, for all inter-PRS spans having more than one intermediate site:

(3C-1) determining first and second terminal PRS sites of the current inter-PRS span;

(3C-2) selecting a first intermediate site in the inter-PRS span, calling it the "current intermediate site"

(3C-3) if the current intermediate site is not an intermediate BITS site, enabling SSM on all network elements at said current intermediate site;

(3C-4) if possible, selecting another intermediate site in the inter-PRS span, calling it the "current intermediate site ";
(3C-5) repeating steps (3C-3) and (3C-4) until all intermediate sites in the inter-PRS span have been considered;
(3C-6) identifying all synchronization distribution paths (SDPs) between the first terminal PRS site and a first intermediate BITS site in the inter-PRS span, called the "current intermediate BITS site", each SDP having two ends, one of which is connected to a respective first network element at the current intermediate BITS site and the other of which is connected to a respective second network element at the first terminal PRS site;
(3C-7) if there is exactly one such SDP, designating that SDP as the "chosen SDP"; otherwise, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;
(3C-8) enabling SSM at the first and second network elements associated with the chosen SDP; and connecting one of the BITS timing inputs at the current intermediate BITS site to a timing reference output by the first network element;
(3C-9) renaming the current intermediate BITS site the "previous intermediate BITS site" and, if possible, selecting another intermediate BITS site in the inter-PRS span, calling it the "current intermediate BITS site";
(3C-10) identifying all SDPs between the current intermediate BITS site and the previous intermediate BITS site in the inter-PRS span, each SDP having two end, one of which is connected to a respective first network element at the current intermediate BITS site and the other of which is connected to a respective second network element at the previous intermediate BITS site;
(3C-11) if there is exactly one such SDP, designating that SDP as the "chosen SDP"; otherwise, verifying whether there is an SDP that has previously been designated as a "chosen SDP"; if so, designating that SDP as the "chosen SDP " and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements;
(3C-12) enabling SSM at the first and second network elements associated with the chosen SDP; and connecting one of the BITS timing inputs at the current intermediate BITS site to a timing reference output by the first network element; and connecting one of the BITS timing inputs at the previous intermediate BITS site to a timing reference output by the second network element;
(3C-13) repeating steps (3C-9), (3C-10), (3C-11) and (3C-12) until the last intermediate BITS site in the inter-PRS span has been considered;
(3C-14) identifying all SDPs between the current intermediate BITS site and the second terminal PRS site, each SDP having two ends, one of which is connected to a respective first network element at the current intermediate BITS site and the other of which is connected to a respective second network element at the second terminal PRS site;
(3C-15) if there is exactly one such SDP, designating that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements; and
(3C-16) enabling SSM at the first and second network elements associated with the chosen SDP; and connecting one of the BITs timing inputs at the current intermediate BITS site to a timing reference output by the first network element.

* * * * *

UNITED STATES PATENT AND TRADEMARK OFFICE
CERTIFICATE OF CORRECTION

PATENT NO. : 6,115,825
DATED : September 5, 2000
INVENTOR(S) : Laforge et al.

It is certified that error appears in the above-identified patent and that said Letters Patent is hereby corrected as shown below:

Column 15,
Line 32, at the end of paragraph 3C-12 after the words "and connecting one of the BITS" add the following:
-- timing inputs at the previous intermediate BITS site to a timing output by the second network element; --
Between lines 32 and 33, after paragraph 3C-12, add the following paragraphs:
-- 3C-13 repeating steps (3C-9), (3C-10, (3C-11) and (3C-12) until the last intermediate BITS site in the inter-PRS span has been considered;

3C-14 identifying all SDPs between the current intermediate BITS site and the second terminal PRS site, each SDP having two ends, one of which is connected to a respective first network element at the current intermediate BITS site and the other of which is connected to a respective second network element at the second terminal PRS site;
3C-15 if there is exactly one such SDP, designated that SDP as the "chosen SDP"; otherwise, verifying whether there is an SDP that has previously been designated as a "chosen SDP"; if so, designating that SDP as the "chosen SDP" and if not, determining whether at least one SDP is part of a ring system; if so, designating as the "chosen SDP" the SDP belonging to the ring system comprising network elements in the largest number of sites; if not, designating as the "chosen SDP" the one which belongs to the system comprising the fewest number of network elements; and 3C-16 enabling SSM at the first and second network elements associated with the chosen SDP: and connecting one of the BITS timing inputs at the current intermediate BITS site to a timing reference output by the first network element. --

Column 18,
Line 51, close parenthesis after the word "SSM"

UNITED STATES PATENT AND TRADEMARK OFFICE
CERTIFICATE OF CORRECTION

PATENT NO.    : 6,115,825
DATED         : September 5, 2000
INVENTOR(S)   : Laforge et al.

It is certified that error appears in the above-identified patent and that said Letters Patent is hereby corrected as shown below:

<u>Column 20,</u>
Line 51, delete the word "and"

Signed and Sealed this

Ninth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,115,825
DATED         : September 5, 2000
INVENTOR(S)   : LaForge et al.

It is certified that error appears in the above-identified patent and that said Letters Patent is hereby corrected as shown below:

Column 15,
Line 32, at the end of paragraph 3C-12, between the words "previous intermediate BITS site to a timing" and "output" add the word -- reference --

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,115,825
DATED : September 5, 2000
INVENTOR(S) : Laforge et al.

It is certified that error appears in the above-identified patent and that said Letters Patent is hereby corrected as shown below:

Column 15,
Line 32, at the end of paragraph 3C-12, between the words "previous intermediate BITS site to a timing" and "output" add the word -- reference --

Signed and Sealed this

Fourteenth Day of September, 2004

JON W. DUDAS
*Director of the United States Patent and Trademark Office*